(12) United States Patent
Edlinger (10) Patent No.: US 6,229,651 B1
(45) Date of Patent: May 8, 2001

(54) OPTICAL ELEMENT AND ITS MANUFACTURING PROCESS

(75) Inventor: Johannes Edlinger, Frastanz (AT)

(73) Assignee: Balzers Aktienresellschaft, Balzers (LI)

( * ) Notice: Subject to any disclaimer, the term of this patent is extended or adjusted under 35 U.S.C. 154(b) by 0 days.

(21) Appl. No.: 08/972,824

(22) Filed: Nov. 18, 1997

Related U.S. Application Data

(63) Continuation-in-part of application No. 08/756,140, filed on Nov. 26, 1996.

(30) Foreign Application Priority Data

Nov. 1, 1996 (CH) .................................................. 2694/96

(51) Int. Cl.[7] ................................ G02B 1/10; G02B 5/04
(52) U.S. Cl. .......................................... 359/583; 359/834
(58) Field of Search .................................. 359/366, 496, 359/352, 834, 634, 495, 583

(56) References Cited

U.S. PATENT DOCUMENTS

| 2,737,076 | 3/1956 | Rock . | |
|---|---|---|---|
| 4,627,009 | 12/1986 | Holmes et al. | 364/559 |
| 4,891,526 | 1/1990 | Reeds | 250/442.1 |
| 5,236,541 | * 8/1993 | Sugahara | 156/556 |
| 5,237,442 | 8/1993 | Khoe et al. | 359/189 |
| 5,260,830 | 11/1993 | Nishida et al. | 359/634 |
| 5,337,178 | 8/1994 | Kung et al. | 359/393 |
| 5,351,925 | 10/1994 | Druais | 248/325 |
| 5,453,859 | 9/1995 | Sannohe et al. | 359/63 |
| 5,583,691 | 12/1996 | Yamane et al. | 359/393 |

FOREIGN PATENT DOCUMENTS

| 4033842 | 10/1990 | (DE) . |
|---|---|---|
| 0359461 | 9/1989 | (EP) . |
| 0359658 | 9/1989 | (EP) . |
| 754590 | 6/1954 | (GB) . |
| 01156701 | 6/1989 | (JP) . |

OTHER PUBLICATIONS

Search Report in PCT/CH 97/00411.

* cited by examiner

Primary Examiner—Cassandra Spyrou
Assistant Examiner—Jared Treas
(74) Attorney, Agent, or Firm—Notaro & Michalos P.C.

(57) ABSTRACT

An optical element has a base body with a surface, an optically effective first layer system of which at least one layer system surface is on the base body and a second optically effective layer system embedded in the base body. The second system terminates in an intersection area with a broad surface of the second system extending along the surface of the base body. The second system has a sequence of optically high and low refraction layers, the high refraction layer consisting predominantly of at least one of $TiO_2$, $Ta_2O_5$, $Nb_2O_5$, $HfO_2$, $ZrO_2$, or $SiO_xN_y$ and the low refraction layer consisting predominantly of at least one of $SiO_2$, $Al_2O_3$ or $SiO_xN_y$. The packing density of the layers of the second optically effective layer system is at least 0.95 and the second layer system is recessed in the intersection area at most by 5 $\mu$m.

11 Claims, 6 Drawing Sheets

OPTICAL ELEMENT AND ITS MANUFACTURING PROCESS

CROSS-REFERENCE TO RELATED APPLICATIONS

This application is a Continuation-in-Part of U.S. application Ser. No. 08/756,140, filed Nov. 26, 1996, which is presently pending.

BACKGROUND OF THE INVENTION

The present invention concerns an optical element that comprises a base body and an optically effective layer system of which at least one layer system surface contacts the base body.

The invention also comprises a related manufacturing process, the utilization of such a component or process, as well as an optical projection arrangement.

INTRODUCTION

For example, in DE-40 33 842 a cuboid optical element composed of dichroitic layers is referred to as a "dichroitic prism".

In the present application the term

X-cube is used.

The present invention starts with the problems that exist with known X-cubes, as described, for example, in DE-40 33 842, or that occur in its manufacture. The present invention which was developed in order to find a solution to the problems with such elements, can be applied to a number of other optical elements.

For this reason this description begins with the specific problems to be solved on X-cubes and based thereon explains the application of the invention in more general terms.

DESCRIPTION

Figure 1:
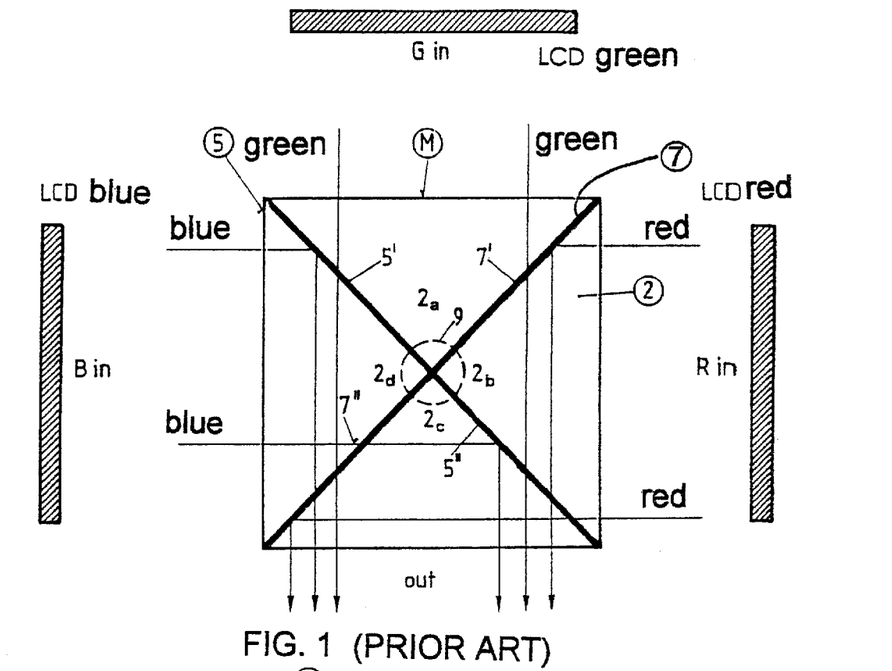
FIG. 1 Top view of an X-cube of the conventional type for explaining the functional principle.

Based on FIG. 1 the basic functional principle of an X-cube is explained. Optical elements of this type are principally used in projectors in order to recombine the red/green and blue channels in the spectral range of the visible light. As shown in FIG. 1 such an X-cube 1 comprises four individual prisms 2a to 2d which can, for example, be made of BK7 glass. In their cross-section they form right-angled isoceles triangles with an angle of 90°, usually with a tolerance of over ±60 angular seconds, and hypotenuse angles of 45° with tolerances of a few angular minutes. The length of the hypotenuse is typically between 5 mm and 50 mm, preferably 40 mm. Embedded between the two prism pairs 2a and 2b on the one side, 2d and 2c on the other side, there is an optically effective layer 5 that largely reflects visible light in the blue range but largely transmits visible light in the green or red range. FIG. 1 shows a part of the blue reflector layer system as a color splitting system, labeled 5', the other 5".

Embedded between the two prism pairs 2a and 2d on the one side, 2b and 2c on the other side there is an additional, optically effective layer system 7, that largely reflects light in the red range but largely transmits light in the green range and the blue range. In FIG. 1 also the two legs of the red reflector layer system are shown as a color splitter system, labeled 7' and 7".

On the X-cube there are three input channels for red, green and blue light from corresponding sources, for example, LCD controlled, and an output channel with the recombined input signals. On the reflector systems, between each of said prism pairs, the correspondingly colored light, and particularly S-polarized light with an incidence angle of less than 45° is reflected. In addition the hypotenuse surfaces of the prisms 2 can be and usually are coated with an antireflection layer system.

Because the pixels of the red-blue-green input channels should converge as accurately as possible, the angle tolerances on prism 2 and in the assembled X-cube must be very narrow.

Large tolerances result in poor imaging quality because the pictures do not accurately converge: blurring or color fringes occur.

Location 9, shown with dashes in FIG. 1 where the four individual prisms 2 meet, is also located within the imaging optical path. Optical interferences created in this location manifest themselves, as mentioned for example, as a blurred picture in the output channel OUT. It is a requirement of such elements and their manufacturing process to minimize the interferences, particularly in this location 9.

From DE-40 33 842, for example, it is known that X-cubes can be manufactured from four prisms 2 according to FIG. 1. The four individual prisms are first manufactured in their exact dimensions through milling, grinding and polishing. Subsequently they are coated with the appropriate layer system along their leg and possibly on their hypotenuse surfaces with an antireflection coating. Finally the coated individual prisms 2 are cemented together.

Much earlier than DE-OS 40 33 842, that is, from U.S. Pat. No. 2,737,076 it was known that when different optical layer systems are created on the leg surfaces of prisms, problems occur at the vertex in area 9 as shown in FIG. 1 with respect to the intersection of the layer systems. In order to solve this problem this application proposes to apply a masking layer to one leg surface each of two 90° prisms and to join the two prisms with the masked surfaces in such a way that the two other leg surfaces are in alignment. These are coated with sulfide and fluoride layers. Subsequently the prisms are broken apart again, one previously coated surface and a leg surface of an uncoated prism are masked, joined, and after removal of the previously applied mask the uncoated, also aligned leg surfaces, are coated with zinc sulfide and lead fluoride coatings—with the latter being a cumulatively acting catalyst poison. The prisms are again separated. Now four of the coated individual prisms are combined into an X-cube after the removal of mask material by means of solvents.

In an advanced development GB-754 590 assumes that it is very difficult to accurately combines the coated individual prisms. For this reason the following solution is adopted:

Two 90° prisms are positioned vertex against vertex with aligned leg surface in such a way that a gap is created between the two other, mutually opposite leg surfaces.

This gap is sealed in the vertex area by means of a soluble mask.

The aligned leg surfaces are coated jointly, the prisms are again separated and the mask removed. The aim is that the coating breaks parallel to the vertex.

A specially coated leg surface and a leg surface of an uncoated prism, with the other leg surfaces aligned on an optically flat block, are cemented together where cement exudation on the vertex is prevented by covers that are removably cemented to the aligned surfaces.

The aligned surface of the prism pair is coated after the cover and the exuded cement have been removed.

A prism pair coated in this manner and a prism pair not coated on the aligned surfaces are cemented together while their relative setting and position are accurately monitored.

Disadvantages of the Known Processes and Known X-Cubes

The effort required for manufacturing the X-cubes as described, for example, in GB-754-590 or DE-40 33 842, is very high: First, each of the three lateral sides of each individual prism 2 must be mounted or fixed by plastering, blocking or wringing as shown in FIG. 1 before the glass can be worked. Subsequently the surfaces must be cleaned for coating the individual prisms 2, and then mounted and dismounted for the coating process. On an average two sides per individual prism need to be coated. This laborious handling considerably raises the production costs for such X-cubes.

From FIG. 1, particularly location 9, it is evident that the coating of the red and blue reflecting layer systems must be executed in such a way that the coating does not wrap around the 90° edges of the individual prisms. This requires sophisticated coating fixtures or masking of the legs on which no coating may be deposited. In this respect we refer to the masks according to GB-754 590 and U.S. Pat. No. 2,737,076 (Rock et al.).

During the coating and the handling of the individual prisms 2, the 90° prism edges are exposed without protection, that is, especially those edges which according to the foregoing explanation must be very accurate. This exposure inevitably leads to chipping unless laborious precautions to protect these edges are taken, which again increases the costs.

If, for example, anything goes wrong during the coating of the individual prisms 2, such an individual piece must be remounted, ground, and repolished, otherwise it will have to be discarded. Correction processes are at best very difficult to implement.

Cementing of the individual prisms 2 in the exact relative position is very difficult and laborious. Complicated processes such as described in DE-40 33 842 are required. Prisms are cemented individually which is time-consuming and therefore costly.

Figure 2:
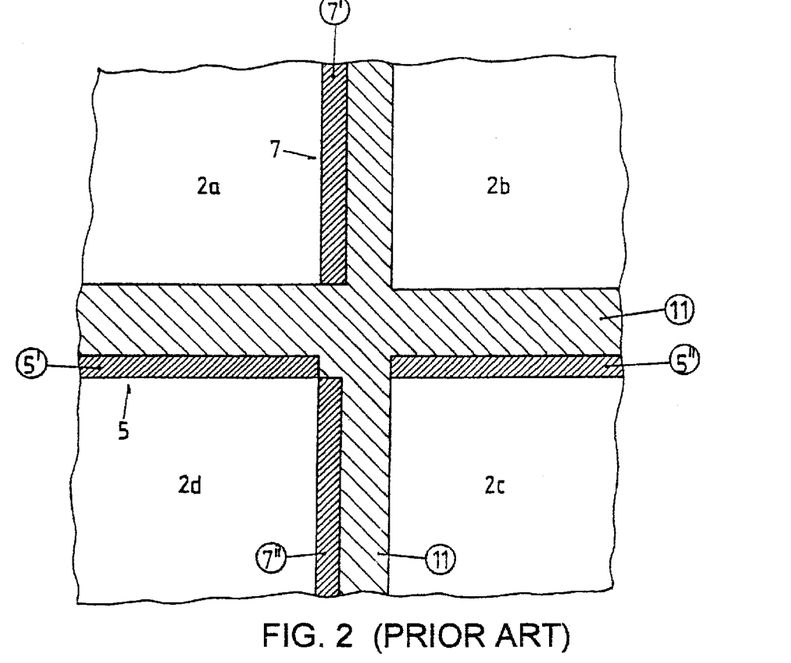
FIG. 2 Central intersection area of the optically effective layer system on a conventional X-cube according to FIG. 1.

Independently of said disadvantages the known process according to DE 40 33 842 results in a structure in location 9 as shown in FIG. 1, as can be seen from the detail in FIG. 2 in which the same reference marks are used as in FIG. 1. Item number 11 identifies the cemented joints. According to GB 754 590 the intersection is formed by a rupture line, a line that may generally be regarded as running parallel to the observed prism vertex but whose actual progression is nearly impossible to manage.

From this it is evident that according to DE 40 33 842 the cemented joints 11 cause an interruption of the red light reflection layer system 7 (consisting of 7' and 7") as well as the blue light reflection layer system 5 (consisting of 5' and 5") and that according to GB 754 590 the intersection of the interrupted layer system to the continuous one is largely random.

As the X-cube is manufactured according to GB 754 590 as well as DE 40 33 842 by cementing the individual prisms 2 whose 90° edges have been exposed to external influences without protection, faults occur almost inevitably in location 9 due to chipping defects along the 90° edges of the individual prisms 2.

SUMMARY OF THE INVENTION

The purpose of the present invention is to propose, based on the components known from GB 754 590, an optical element, in particular an X-cube, which is not afflicted by the disadvantages explained on the basis of FIG. 2.

It is also the objective of the present invention to propose a manufacturing process that is not afflicted by said disadvantages in production, in particular of said X-cubes. The manufacturing process to be found should by highly economical, afford greater accuracy, and require fewer process steps.

In an optical element of the type referred to at the beginning, this is achieved by continuously finishing the surface of the basic body. In this way it is possible to design the first mentioned, areally continuous, optically active layer system in such a way that the second layer system is defined and intersectis most accurately with the surface of the first one. A structure as has been explained based on FIG. 2 is also avoided: According to the invention, with reference to FIG. 2, one of the layer systems, preferably 7, is continuous; individual sections 7', 7" no longer exist. According to the invention a second layer system, preferably system 5, 5' intersectis with continuous layer system 7 accurately and in a defined manner, and in the case of an X-cube also a third layer system, 5". The latter is not illustrated in FIG. 2 which shows only the familiar intersection structures. An element according to the invention is characterized further by the feature of claim 6.

In a preferred design version of an element according to the invention or in the element according to claim 6 of this invention, the layer systems consists of a sequence of optically high or low index layers. The material for the high index layers consists at least predominantly preferred of an oxide or oxinitride, preferably at least one of the following:

$TiO_2$, $Ta_2O_5$, $Nb_2O_5$, $HfO_2$, $ZrO_2$, $SiO_xN_y$.

For low index layers, at least predominantly preferred an oxide or oxinitride, preferably one of the following materials is used:

$SiO_2$, $Al_2O_3$, $SiO_xN_y$

The packing density of the layers on the said elements according to the invention is preferably at least 0.95, preferably even 0.97.

With respect to the definition of the packing density reference is made to H. A. MACLEOD, "Thin Film Optical Filters", pp. 398, $2^{nd}$ ed., Adam Hilger ltd., Bristol.

The choice of the specified layer materials and their high packing density easily allow, as mentioned, to continuously and mechanically finish the surface of the base body and the broad surface of the second aforementioned layer system.

In a preferred design version of the element according to the invention as described in claim 1 or on the element according to claim 6, the layers are often X-ray amorphous. In particular their spectral characteristics shift by max. 5 nm within a temperature range of 20° C. to 100° C.

On the element according to the invention as described in claim 1 and on the element according to claim 6, the layer systems mechanically conform to the standard MIL-M-13508 C (L-T-90 D or A-A113B) and they further mechanically and chemically conform to the standard MIL-C-675 B/C.

Characteristic for the process according to the invention is that for solving the aforementioned task one surface each is created on at least two sub-bodies of the base body of the element, where said two surfaces are complementary to each other on at least two sub-bodies, that is, they fit together with close tolerances. Subsequently at least one of these complementary surfaces is coated with an optically effective layer system, in particular the red or blue reflection layer system, if the element to be produced is an X-cube.

Subsequently, said sub-bodies are joined, for example, by cementing, along said complementary surfaces with their now embedded layer system. A composite sub-body is thus formed. On the composite sub-body one surface that is common to at least two sub-bodies is mechanically surface finished which surface is at an angle to the complementary, interconnected surfaces, so that the complementary surfaces along which the sub-bodies are connected intersect the common, finished surface, together with the embedded layer system. Finally another optically effective layer system is deposited along this jointly mechanically finished surface.

The preferred design versions of the element or process according to the invention are specified in the dependent claims.

With respect to said process according to the invention, one of the essential aspects for efficient and consequently economical production is that the element is assembled from cuboid sub-bodies and that the surfaces which are oblique to the cube surfaces are formed last. This allows very accurate positioning and surface finishing steps because only parallel surfaces exist on the processed bodies until the very last step.

The element according to the invention is preferably used as an X-cube, or the process according to the invention is preferably used for manufacturing such X-cubes. In addition an optical projection arrangement with at least one element designed as an X-cube according to this invention is proposed which due to the low optical interference according to the invention, especially in the center area 9 shown in FIG. 1, has excellent optical properties where in particular a CCD camera is proposed that is equipped with such an X-cube for color splitting. In such an optical device the size of zones with interference should be smaller than a single pixel which today is in the magnitude of 4 $\mu$m.

An optical projection arrangement with at least one element designed as an X-cube according to this invention has significantly reduced optical interference, especially in the center area 9 shown in FIG. 2, and due to the proposed production process can be manufactured more economically and more accurately.

The invention is subsequently explained by means of the following illustrations:

DETAILED DESCRIPTION OF THE INVENTION

Figure 3:
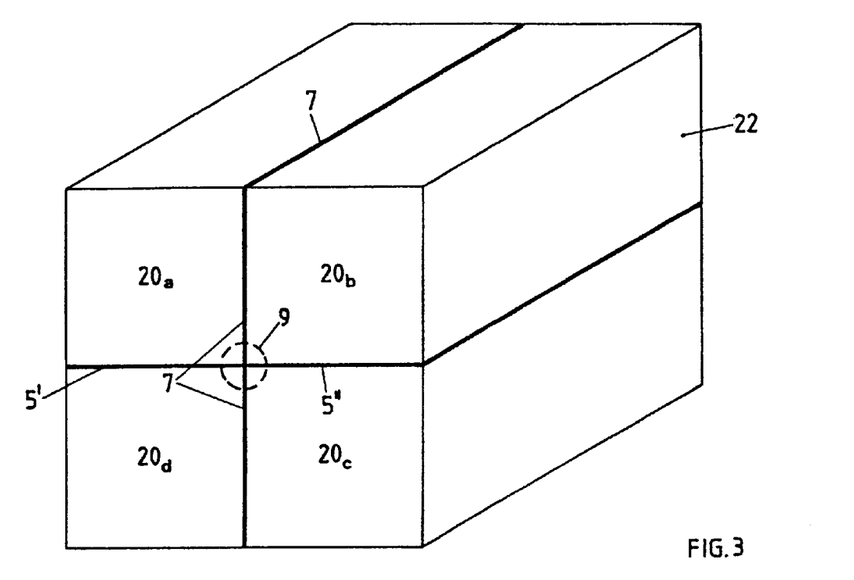
FIG. 3 Perspective view of an intermediate product resulting from the process according to the invention, a product that is already an optical element according to the invention.

With respect to the production process of an X-cube according to the invention, FIG. 3 shows already an intermediate product according to the invention; it is the cuboid product from four sub-cubes 20a to 20d. Between the sub-cube pairs 20a and 20d on the one side and 20b and 20c on the other, there is a first optically effective layer system—for X-cube production and analogously to FIG. 1 layer system 7—whereas between the cube pairs 20a and 20b or 20d, 20c there is another optically effective layer system, that is, in the X-cube production and with respect to FIG. 1 layer system 5 with the parts 5' and 5". For the production of the X-cube length 1 of cube 22 is 1 to 8 X-cube lengths or greater, in particular 4 X-cube lengths, in FIG. 1 measured perpendicularly to the plane of the illustration. Basically this product whose manufacturing steps will subsequently be explained, is characterized as follows:

All existing angles are 90° (±tolerances), which means that the sub-bodies 20 and the intermediate product 22 are easy to manufacture, because among others, the opposite sides can be machined at the same time such as by dual lapping or dual polishing. The resulting planarity, particularly on adjacent surfaces of the cube is so high that interferometric analyses show maximum 20, preferably only 10 or preferably maximum 5 interference rings.

In simultaneous double-sided machining high parallelisms of the mutually opposite surfaces can be achieved, for example, with deviations of <2 $\mu$m across a length of 150 mm. In addition a high planarity of each surface is achieved, for example, with planarity deviations of <1 $\mu$m across lengths of 150 mm.

As all angles involved are 90° (±tolerances), each of the parts 20a to 20d and 22 can be easily mounted and positioned. In dual lapping or dual polishing operations no elaborate fixture is required and the corresponding part can simply be inserted into a polishing insert. Mounting of the parts by plastering, blocking or wringing can preferably be eliminated.

All angles involved can be manufactured with high precision because they are all 90° and there are no 45° angles, for example, that are much more difficult to produce. For the 90° central angles in particular the angle tolerances should be no greater than ±60 angular seconds, preferably no greater than ±20 angular seconds.

The measurement instrumentation for geometrically measuring the produced parts can be kept very small by using an interferometer, for example.

Particularly when plan parallel complementary surfaces to be cemented are used, cementing is very easy and cemented joints of accurately defined thickness can be produced, the thickness of which should not exceed 10 $\mu$m and preferably be no greater than 3 $\mu$m.

The production of such parts is easy to scale, that is, by using plates of various sizes several workpieces 22 referred to as T-cubes can be produced in a single piece that is subsequently singularized, preferably by sawing.

Optical measuring on coated surfaces of cuboid bodies with plan parallel surfaces is much simpler than on triangular prisms.

Figure 4A:
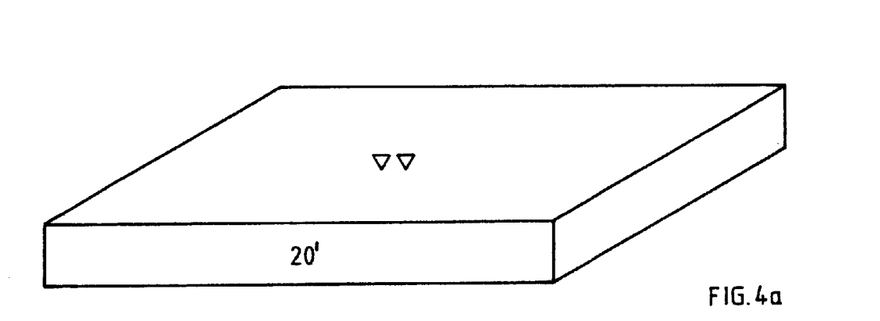
FIGS. 4a to 4h Intermediate product resulting from the process according to the invention, where the structures according to FIGS. 4f, g and h already represent an optical element according to the invention.
Figure 4B:
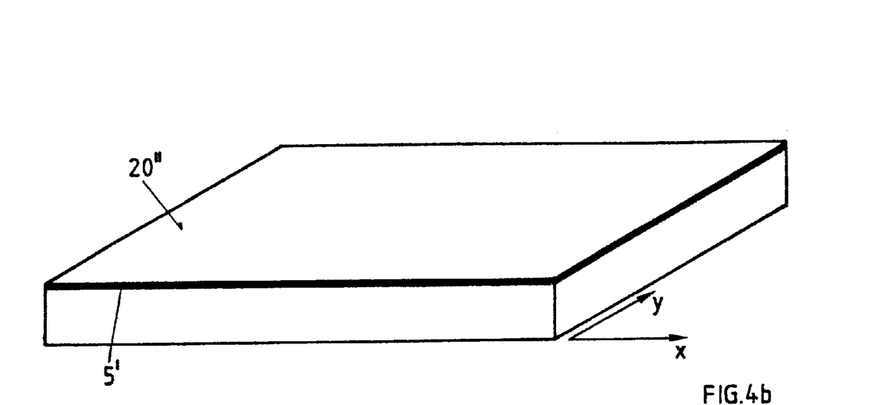
Figure 4C:
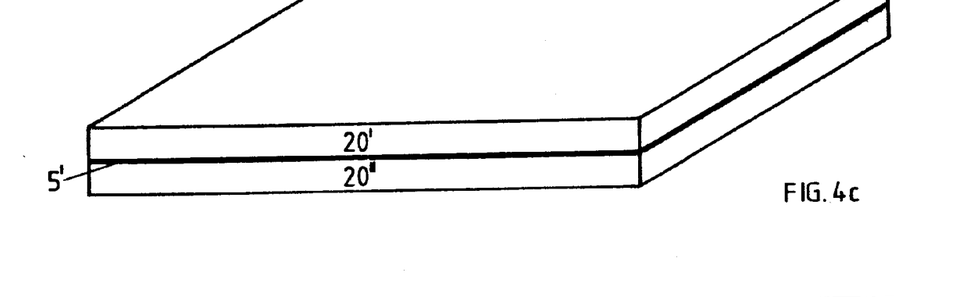

The following step-by-step description based on FIGS. 4a to 4c describes the manufacturing of body 22 shown in FIG. 3 which is already a product of the invention. It will become obvious that the disadvantages in the central area 9 as discussed on the basis of the current state of the art and FIG. 2 are effectively eliminated with respect to layer arrangement and edge precision.

FIG. 4a shows a plate for blanks 20'. Their dimension is preferably within the range (100–200 mm)×(100–200 mm)×3–40 mm), typically within the range 190 mm×178 mm×3 mm or 190 mm×178 mm×40 mm.

Through dual lapping, mutually opposite surfaces are machined according to FIG. 4b, particular the surfaces ▼▼.

Subsequently one of the surfaces ▼▼ of plate 20' is coated with a layer system 5' according to FIG. 4b, resulting in plate 20".

If the manufacturing process described here involves the production of X-cubes, preferably and as shown in FIG. 4b the blue reflection system 5' is deposited because the blue image may have more blur than the red image due to the corresponding sensitivity of the human eye.

It should be noted here that the plate 20' corresponds to the dimension of one or several elements, preferably four, in direction y as well as direction x; singularization in both dimensions will be performed later.

According to FIG. 4c one plate 20' and one plate 20" are laminated, preferably by cementing, in such a way that the aforementioned layer system, preferably the blue reflection system 5', is embedded between them.

Whether only the surface of one of the plates 20" involved is coated or both, and correspondingly the cement film is located between the surface of one plate 20' and the layer, or between two layers, depends on the intended application. Preferred in the production of X-cubes is the coating of one of the complementary surfaces involved, and cementing of this surface with the complementary surface of the uncoated plate 20".

The term complementary surfaces is used because, as will be shown later for other applications, the bodies with surfaces of any curvature can be placed on top of each other with the embedded layer system, provided the surfaces involved are complementary with the required accuracy.

Figure 4D:
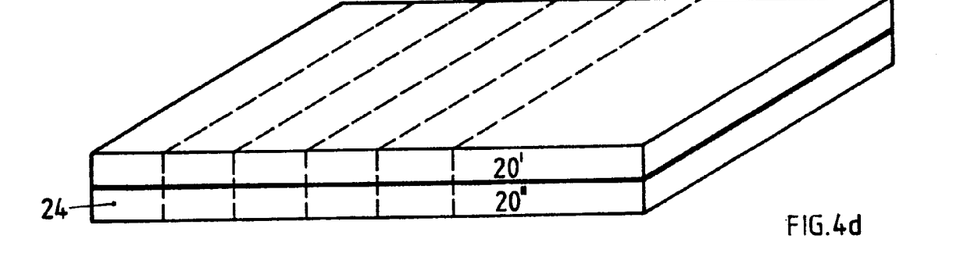

As shown in FIG. 4d the dual plates 20' and 20" are singularized by sawing them into bars 24.

Figure 4E:
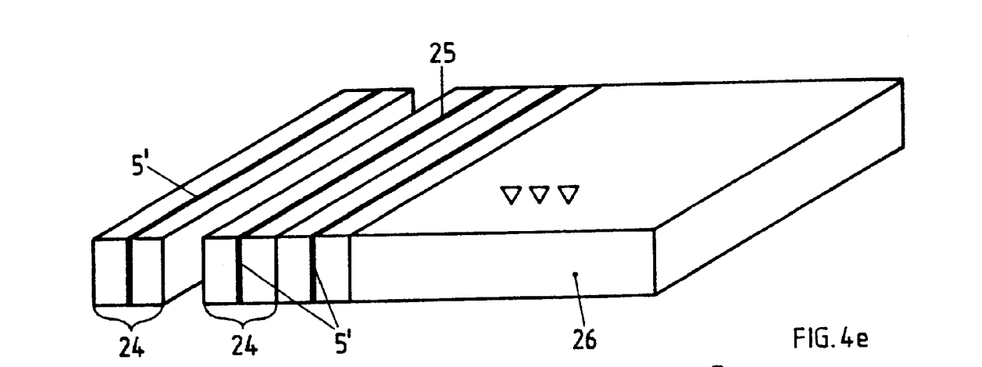

As shown in FIG. 4e the sawed bars 24 are tilted by 90° and preferably two or more such bars are placed adjacent to each other, 26, or as shown in the diagram on the left, an individual bar 24 is further processed.

For forming the plate 26 the bars must be aligned in such a way that in the next processing step the second layer system which in the X-cube production is the red reflection system 7, is deposited exactly perpendicular on the surface to be processed. This is greatly simplified by the fact that all surfaces of the bar or bars 24 are perpendicular and practically plan parallel to each other and because they are extremely flat. For example, as indicated at 25, preferably several bars 24 can be wrought together in order to compensate any angular error resulting from the sawing process. As mentioned and as shown on the left, also individual bars 24 can be lapped or polished if the sawing process is sufficiently accurate.

As shown with ▼▼▼ the opposite lateral surface of plate 26 or of the individual bar 24 can now be dual lapped or dual polished, with the intersection areas of layer systems 5'.

Figure 4F:
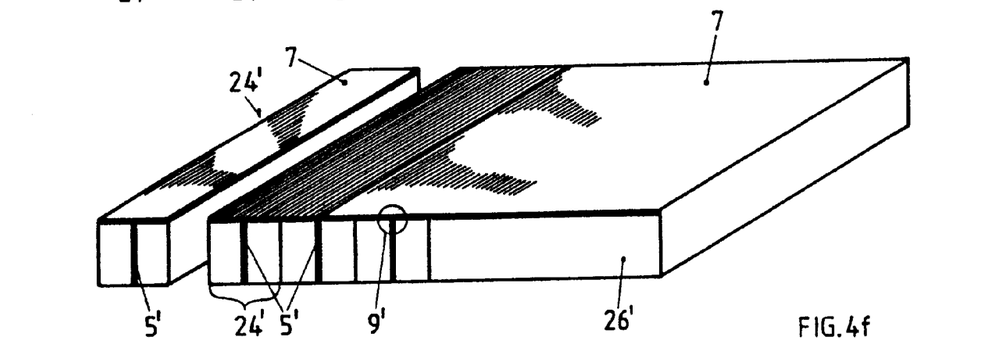

As shown in FIG. 4f and as a very important step of this invention, one of the polished surfaces of the plate 26 or the individual bar 24, in the first case for all bars 24 involved, are jointly repolished and subsequently coated. In the X-cube production a red reflection layer system 7 is deposited at this point, as shown in FIG. 4f.

In this way the first layer system 5' and the cementing film are full-surface coated with 7 after repolishing. Preferably a relatively cold coating process is used, preferably a plasma and/or ion assisted coating process, preferably a sufficiently cold PVD process, preferably sputtering, or PECVD process, but in particular a cold coating process with substrate temperatures not exceeding 150° C., preferably not exceeding 80° C. The preferred layer system structure, the preferred layer materials, and the preferred packing density of the layers have been explained further above.

The structure of the process according to FIG. 4f and the procedure proposed so far are inherently inventive, regardless of whether or not the layer systems represented with 5' and 7' are deposited perpendicularly or obliquely to each other, and whether or not the coated surfaces are plane or as mentioned above, complementary curved. Intersections 9' are created on which one layer system—7—continuously overlaps the intersection of the second layer system—5— where the surface coated by system 7 is mechanically surface finished in a uniform manner.

Figure 4G:
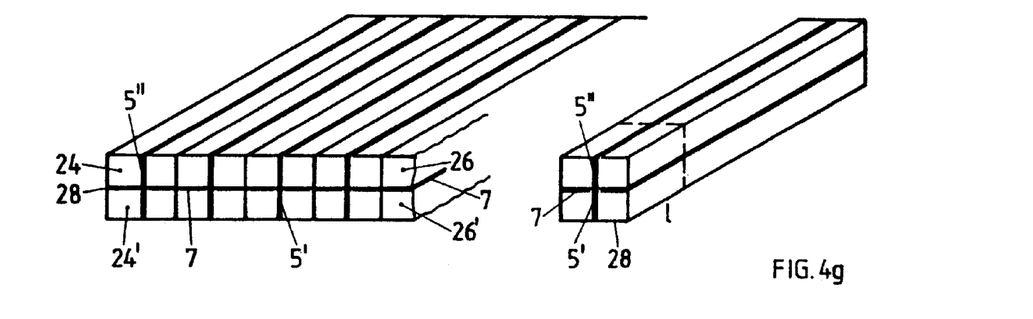

According to FIG. 4g an uncoated plate 26 or an uncoated individual bar 24, after unwringing if applicable, and a coated plate 26' or a coated individual bar 24' are placed on top of each other and cemented as shown in FIG. 4f. The layer system 5' of the uncoated plate 26 or the uncoated bar 24, as the third deposited layer system in addition to the two systems 7 and 5' on the coated plate 26' or the coated bar 24', now becomes layer system 5".

Figure 4H:
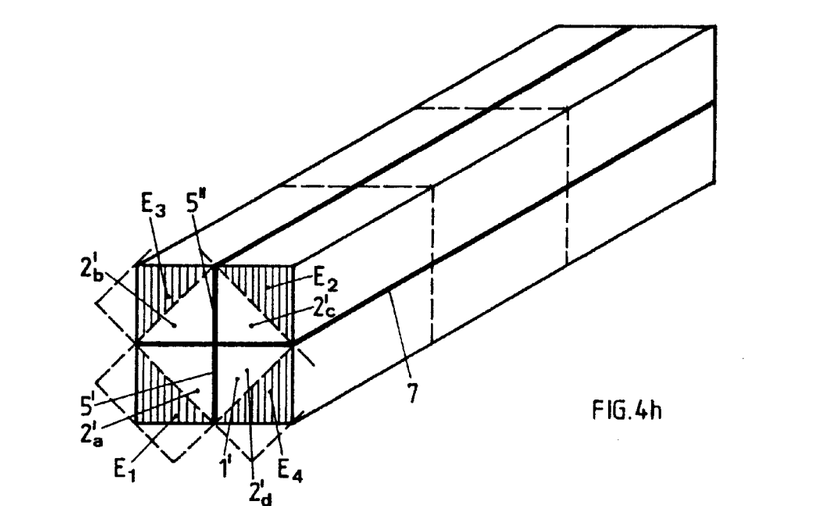

The resulting T-cube strips 28 are singularized into the desired lengths 1. But before singularization for the production of the X-cube the T-cubes 28 as shown in FIG. 4h are preferably chamfered by sawing and by machining their surfaces along planes E, preferably again on two sides, as shown with E1, E2, and E3, E4 respectively. After cutting to size in direction 1, very accurate X-cubes 1' according to the invention are obtained. The 45° angle tolerances do not exceed ±2 angular minutes, preferably no more than ±1 angular minute.

If-applicable the chamfered surfaces corresponding to planes E in FIG. 4h are coated with an antireflection system before the X-cubes are singularized, if this step is required.

Figure 5:
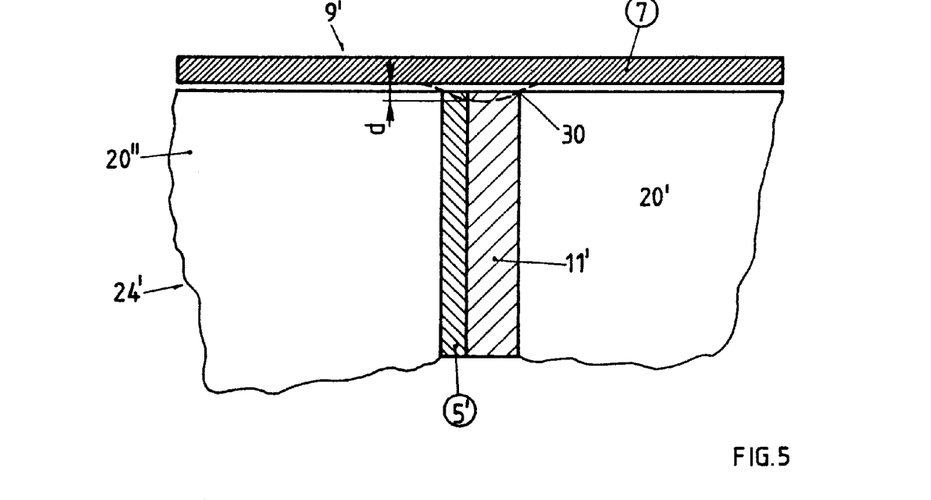
FIG. 5 Enlarged view showing the intersection area of the layer system on the intermediate product according to the invention as shown in FIG. 4f.

Looking back at FIG. 4f, FIG. 5 is a detail 9' of an optical element 1 according to the invention, as it occurs in the production of X-cubes. In the latter a first optical layer system corresponding to 5' made of glass or plastic, preferably BK7 glass or polycarbonate or PMMA, which in X-cube production is the blue reflection system, is located between the plan parallel surfaces of the two separated bodies 20', 20" (FIG. 4e, 4d). The two bodies 20', 20" are cemented at 11'. After joint surface finishing by polishing or lapping, layer system 5' covered with cement film 11', the second optical layer system corresponding to 7, in the case of the X-cube a red reflection system, is deposited on both bodies 20' and 20"'. As can be seen from the comparison with FIG. 2, the bisectioning of 7 into 7' and 7" is eliminated through this invention.

Through the common mechanical surface finishing the intersection area normally exhibits only a slight indentation of the cement film 11' as shown at 30 in FIG. 5, or of the layer system 5' which has a maximum depth d with respect to the plane surface of layer 7 of max. 5 μm, preferably max. 2 μm.

Figure 6:
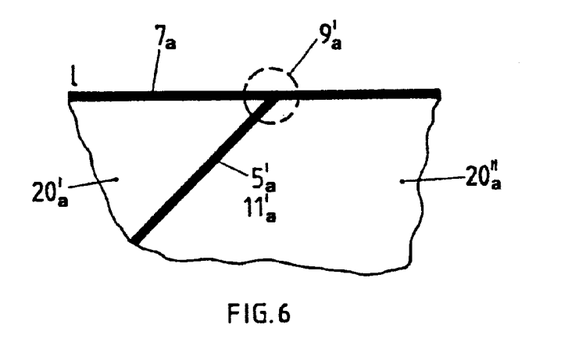
FIGS. 6 and 7 Generalized optical element structures according to the invention with their layer system intersection areas.

FIG. 6 shows in a generalized concept of FIG. 5 an optical element according to the invention in which the second layer system 5'*a* intersects obliquely with the plane layer system 7*a*.

Figure 7:
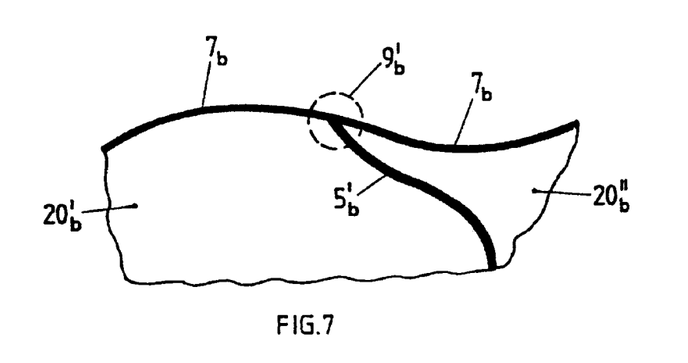

In FIG. 7 the complementary surfaces of the bodies 20'*b'*, 20"*b* are curved, the same applies to the common surface coated with layer system 7*b*. In a highly defined manner layers 5' and 7' intersect according to FIG. 5, for X-cube production in particular at a right angle. The one layer system—7—is continuous and in particular runs also across the point of intersection. This is particularly important in all applications where the intersection areas, for example corresponding to 9'*b* in FIG. 7 or 9'*a* or 9' in X-cube production, have an effect on the optical path of the light influenced by the layer systems, in particular the visible light. The professional now readily recognizes, particularly in conjunction with FIG. 4, how analogously optical elements can also be manufactured according to FIGS. 6 and 7, optical elements which according to current knowledge have probably never been realized. This results in completely new component structures that are suitable for optical beams in the visible range as well as the non-visible spectral range such as UV or IR.

Figure 8:
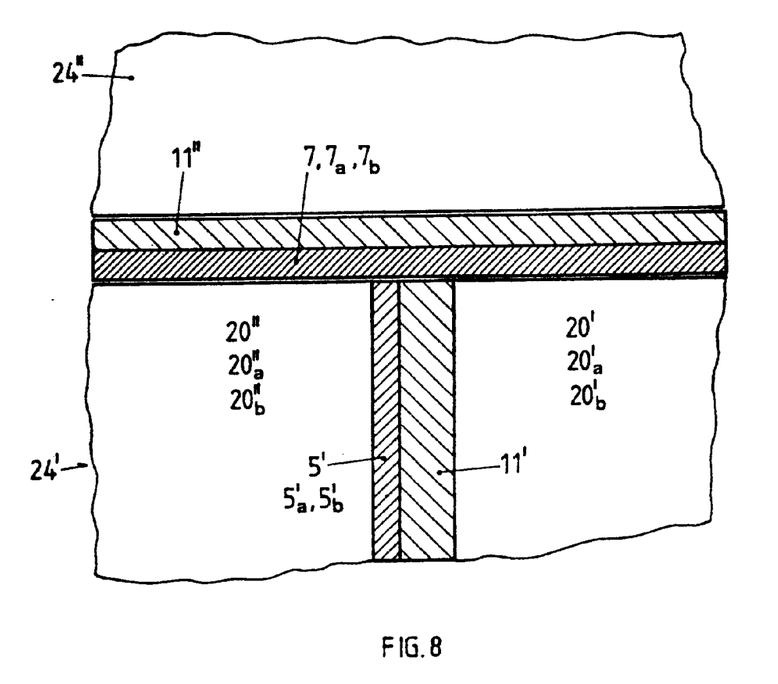
FIG. 8 An enhanced development of the optical element illustrated in FIG. 5, or its intersection area according to the invention.

FIG. 8 shows the structure of another element according to the invention in which, based on the one in FIG. 5 and analogously to FIGS. 6 and 7, the continuous layer system 7 or 7*a* or 7*b* is covered by an additional body 24" and a cement film.

Figure 9:
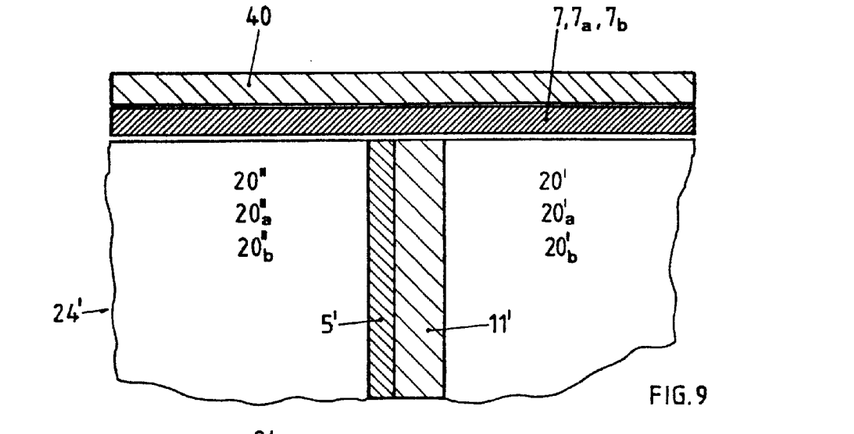
FIG. 9 Based on the intersection area shown in FIG. 5, an enhanced development of an element according to the invention.

FIG. 9 shows the intersection area on the element according to the invention, for example, as shown in FIG. 5, in which the layer system 7 or with respect to FIG. 7, 7*a* or 7*b* is additionally coated, for example with a protection layer system 40.

Figure 10:
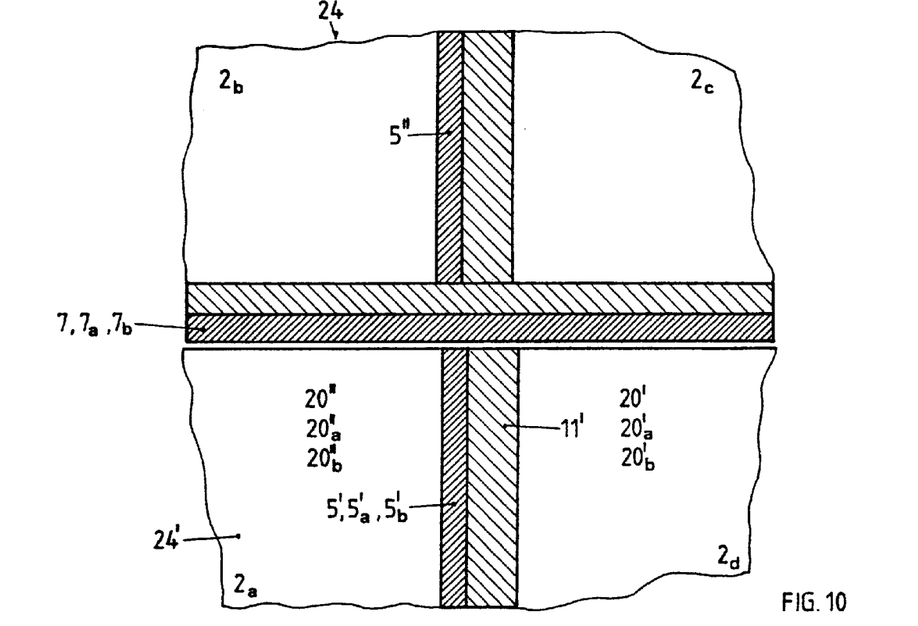
FIG. 10 Central intersection area on an optical element according to the invention, particularly as manufactured by the production process according to the invention, in comparison with the traditional intersection area shown in FIG. 2 on traditional optical components of the X-cube type.

Finally FIG. 10 shows the intersection area resulting in the production of a structure according to FIG. 3, that is, particularly an X-cube, where the continuous layer system 7 is preferably designed as a red reflection system. An analogous element indicated with the reference marks 'a' or 'b' is obtained based on FIG. 6 or 7.

Figure 11:
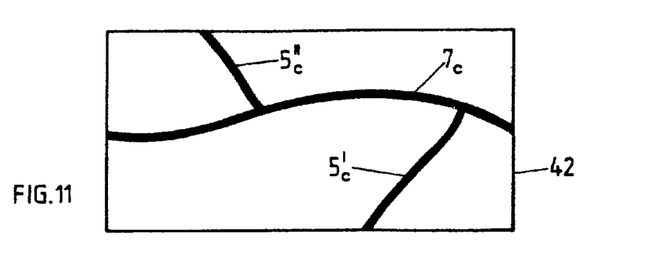
FIG. 11 Schematic representation of a generalized optical element according to the invention as can be realized with the aid of the present invention.

FIG. 11 shows such a generalized optical element 42 according to the invention; the professional readily recognizes the multitude of possibilities that are opened by this invention.

In particular in the X-cube production with 90° blanks the more accurate machinability of mutually opposed surfaces, the cementing of the blanks, the joint coating and surface finishing and, preferably, the singularization into individual optical elements as the last step affords a considerable reduction of the manufacturing costs. It also results in elements with significantly fewer optically effective fault locations when we take into consideration that in the proposed process the delicate, centrally located 90° edges are never exposed.

Dielectric layer systems with at least one dielectric layer are preferably used as optically effective layer systems, particularly in the production of X-cubes. Suitable coating processes are the aforementioned, sufficiently cold processes. Of course, elements can be manufactured that are effective in spectral ranges other than visible light, for example in the UV or IR range, and in addition to color splitting layer systems also reflection layer systems, antireflection layer systems, or polarization layer system can be used or integrated. In particular X-cubes used in projection systems can be manufactured for which high-precision, low-cost optical elements are required.

Preferred Design Versions:

Based on the invention X-cubes were produced in which, for example with respect to FIG. 3 and in particular the central area 9, the layer systems 7, 5 ' 5" mutually intersect at 90° with a tolerance of maximum 20 angular seconds. The offset of the intersections of layer systems 5' and 5''' does not exceed 2 μm.

The examination of the planarity, in particular of the intersecting surfaces by means of an interferometer shows maximum 20 interference rings, preferably less than 10 or even preferably less than 5 interference rings.

For cementing the sub-bodies an optical cement, preferably an UV hardening cement such as Delo Photobond 4302-1 is used. The thickness of the cement films is maximum 10 μm, typically preferred maximum 3 μm.

The layer systems are deposited as a sequence of optically high and low refraction layers where the high refraction layers at least predominantly consist of an oxide or oxinitride and preferably of at least one of the materials $TiO_2$, $Ta_2O_5$, $Nb_2O_5$, $HfO_2$, $ZrO_2$, $SiO_xN_y$.

For the low refraction layers a material is preferably used that consists at least predominantly of an oxide or oxinitride, preferably of at least one of the materials $SiO_2$, $Al_2O_3$, $SiO_xN_y$.

The packing density of the layers is at least 0.95, preferably at least 0.97 which in particular is achieved through sputtering or ion-assisted coating. The spectral temperature drift of the layers on air, with a change in the ambient temperature from 20° C. to 100° C. is maximum 5 nm, preferably maximum 2 nm.

The deposited layer systems are mechanically stable and conform to the standard MIL-M-12508C (L-T-90 or A-A113B), and with respect to mechanical and chemical stability they conform to the standard MIL-C-675B/C.

The layers are preferably deposted by plasma and/or ion-assisted coating, preferably by a sufficiently cold PVD or PECVD process and in particular preferred a cold coating process with substrate temperatures not exceeding 150° C., preferably not exceeding 90° C.

What is claimed is:

1. Optical element, comprising:

a base body having a surface, an optically effective first layer system of which at least one layer system surface is on the base body, a second optically effective layer system embedded in the base body that terminates in an intersection area with a broad surface of the second optically effective layer system extending along said surface of the base body, at least the second optically effective system comprising a sequence of optically high and low refraction layers, the high refraction layer consisting predominantly of at least one of the materials:

$TiO_2$, $Ta_2O_5$, $Nb_2O_5$, $HfO_2$, $ZrO_2$, $SiO_xN_y$, and the low refraction layer consisting predominantly of at least one of the materials:

$SiO_2$, $Al_2O_3$, $SiO_xN_y$, a packing density of the layers of the second optically effective layer system being at least 0.95 and the second layer system being recessed in the intersection area at most by 5 μm.

2. Element according to claim 1 in which the first layer system is recessed in the intersecting area in the direction of the second layer system where the recess depth is not greater than 2 μm.

3. Element according to one of the claims 1 where between 20° C. and 100° C. the layer systems have a shift in their spectral characteristics of maximum 5 nm.

4. Element according to claim 1 where the base body consists of at least two parts cemented together along one of the layer systems and the thickness of the cement film is maximum 10 μm.

5. Element according to claim 1 where a second surface of first layer system also coincides with the base body and consequently is embedded in at least one area within the base body.

6. Element according to claim 5 where a third layer system intersects at an angle with the second surface of the first layer system, where:

said broad surface of the second and the third layer system terminate with an offset of at least 2 μm and essentially the same angles to the base body surface in the intersection area, at angles that do not deviate by more than 20 angular seconds.

7. Element according to claim 6 in which the first layer system is planar, the broad surface of the second and third are mutually opposed, with an offset of maximum 2 μm, and where the first, second and third layer system are on diagonal surfaces of a cuboid base body.

8. Element according to claim 7 that is an X-cube and where the first layer system selectively reflects most of the light in the visible RED range but transmits at least most of the light in the visible BLUE and GREEN range and where the second (5') and third layer system reflects at least most of the light in the visible BLUE range and conversely transmits at least most of the light in the GREEN and RED range respectively.

9. Element according to claim 1 where at least two of the bodies separated by the layer systems consist of material with identical optical properties.

10. Element according to claim 1 in which the base body parts between which one of the layer systems is accommodated, is made of glass or plastic.

11. Element according to claim 1 in which at least one of the layer systems has at least one dielectric layer and a polarization layer system or a color splitting system or an anti-reflection layer system, and a red or blue reflection system of S-polarized light with an incidence angle of 45°.

* * * * *